Jan. 22, 1957  G. E. PIHL  2,778,988
ELECTRICAL PHASE SHIFTING DEVICE
Filed Jan. 21, 1955
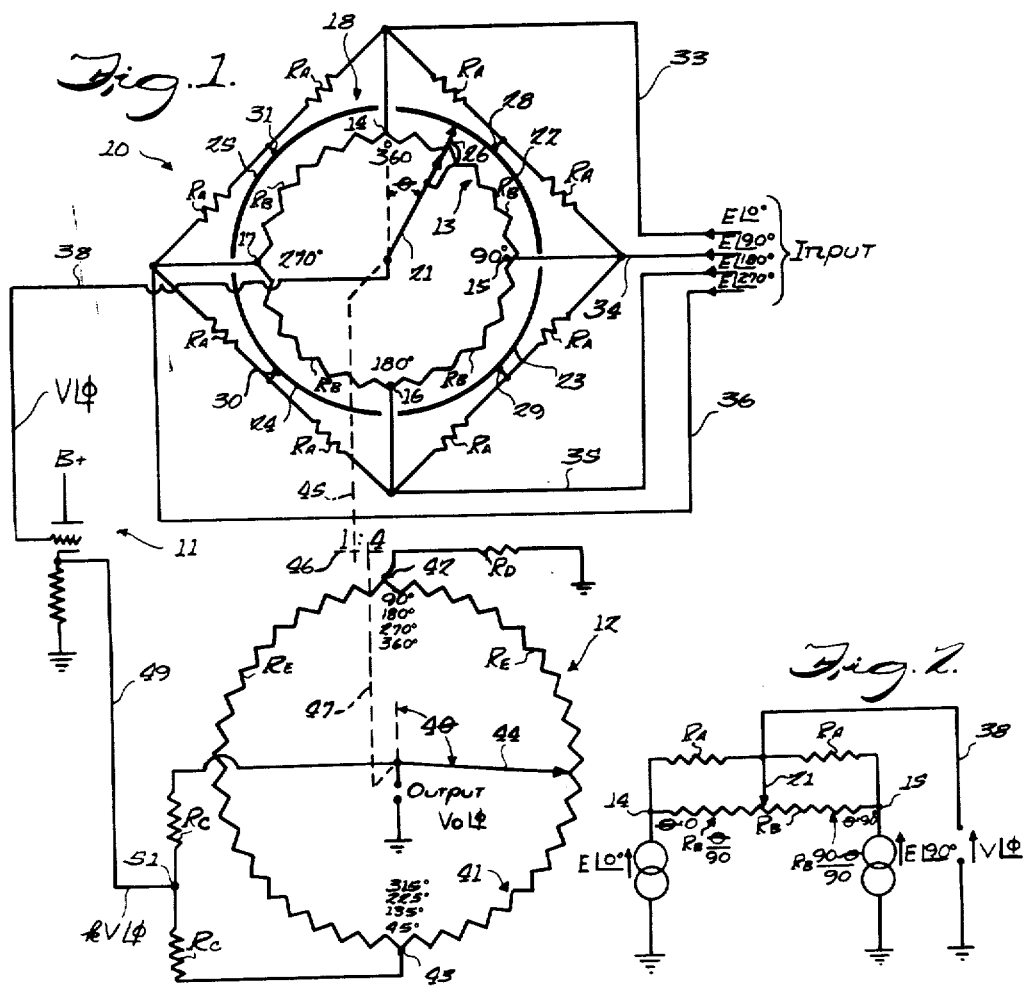
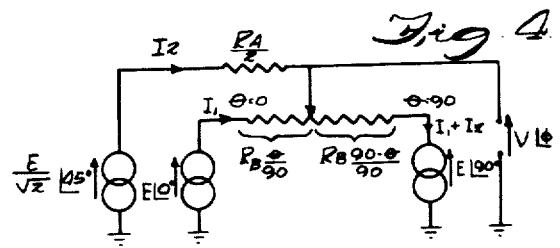
Inventor
George E. Pihl
by Alvin O. Graf
Attorney

2,778,988
Patented Jan. 22, 1957

United States Patent Office

2,778,988

ELECTRICAL PHASE SHIFTING DEVICE

George E. Pihl, Abington, Mass., assignor to Acton Laboratories, Inc., Acton, Mass.

Application January 21, 1955, Serial No. 483,307

8 Claims. (Cl. 323—123)

This invention relates to an electrical phase shifting device, and more particularly to such a device in which the phase angle of the output voltage varies linearly with the position of a potentiometer.

Various inductive and capacitive devices which provide a continuously variable, phase shiftable output voltage, have been known for some time. The present device obtains its phase-variable output by using resistive components fed by voltages having a quadrature phase relationship.

Accordingly it is an object of this invention to provide a new and improved electrical phase shifting device.

Another object of this invention is to provide an improved phase shifter having a 360° phase-variable output voltage which varies linearly with the position of a potentiometer.

Another object of this invention is to provide an improved phase shifter which has a high degree of accuracy over the full range of its linearly calibrated dial while being relatively inexpensive to produce.

Still another object of this invention is to produce a simple phase shifting device utilizing linear potentiometers which is easy to maintain and dependable in operation.

Other objects and advantages of this invention will be apparent during the course of the following description when read in connection with the accompanying drawings, wherein:

Figure 1 is a schematic wiring diagram of the phase shifter of this invention;

Figure 2 is an equivalent circuit diagram of the first quadrant of the phase shift section of this device, including the various voltages applied to and generated by the phase shift section;

Figure 3 is a vector diagram showing the relationship of some of the voltages appearing in the phase shift section of this device; and Figure 4 is a simplified equivalent circuit diagram of the first quadrant of the phase shift section of this device based, in part, on the voltage relationship disclosed by Figure 3.

Referring now more particularly to Figure 1, there is shown a typical embodiment of the phase shifting device of this invention consisting of a phase shift section 10, a cathode follower isolation section 11, and an amplitude correcting section 12.

The phase shift section 10 employs a 360° linear wire wound potentiometer 13 having taps 14, 15, 16 and 17 at 90° intervals, a four segment commutator 18, and a set of eight fixed resistor $R_A$. The wire winding $R_B$ of the potentiometer 13 has a wiper arm 21 positioned to be movable along the length of the winding. The four segments 22, 23, 24 and 25 of the commutator 18 are arranged to be sequentially contacted by a wiper arm 26. They are insulated from one another and each occupies just a little less than 90° of arc in order to permit electrical insulation. A single wiper arm 26 rotates at a fixed radius from its center of rotation in contacting engagement with the commutator segments and is of sufficient width so that it makes contact with the next adjacent commutator segment before leaving the prior one. This continuity prevents incorrect transient phase results at points intermediate the commutator segments.

As is readily seen, a somewhat more complex commutator structure using two wiper arms or two commutators operating in parallel, each having its own wiper arm, would permit the commutated segments to extend through a full 90° of arc and still be electrically insulated from one another.

The wiper arm 26 of the commutator 10 is both mechanically and electrically connected to the wiper arm 21 of the potentiometer 13. The movement of the wiper arm 26 across a commutator segment in effect shades the movement of the wiper arm 21 between the corresponding two adjacent taps 14—15, 15—16, 16—17, and 17—14 of the potentiometer 13. Electrical connecting terminals 28, 29, 30 and 31 are provided on the commutator segment 22, 23, 24 and 25, respectively. The eight resistors $R_A$ are connected between the taps of the potentiometer winding 13 and the connecting terminal of the commutator segments, one each between the following taps and connecting terminal, respectively: 14, 28; 28, 15; 15, 29; 29, 16; 16, 30; 30, 17; 17, 31; and 31, 14.

Four phase-displaced voltages having a quadrature phase relationship are connected to the taps of the potentiometer 13, respectively. The first voltage E, hereafter referred to as E $\angle 0°$, is fed to the tap 14 through a conductor 33. The second voltage E, hereafter referred to as E $\angle 90°$, is applied to the tap 15 through a conductor 34. The third voltage E, hereafter referred to as E $\angle 180°$, is applied to the tap 16 through a lead 35, and the fourth voltage E, hereafter referred to as E $\angle 270°$, is applied to the tap 17 through a conductor 36. The four voltages E $\angle 0°$, E $\angle 90°$, E $\angle 180°$, and E $\angle 270°$ may be obtained from an external source in any well known manner, such as a phase quadrature power supply.

The output from the phase shift section 10 is taken from the wiper arm 21 through a lead 38 to a cathode follower stage 11 which acts to isolate the phase shift and amplitude correcting sections of this device.

The isolation stage 11 is employed because the internal output impedance of the phase shifting section is high and variable, and therefore is not well adapted to work into any loading since serious amplitude variations would result. The amplitude correcting section must work out of a low impedance source, since the input impedance of this section varies widely as the control is rotated. The low internal ouput impedance of the cathode follower 11 satisfies this requirement.

The amplitude correcting section 12 employs a 360° linear potentiometer 41 having two taps 42 and 43 displaced 180° from one another to define the two winding sections $R_E$. One tap 42 is physically positioned to correspond to one tap 14 of the potentiometer 13, while the other tap 43 is positioned to correspond to another tap 16 of the potentiometer 13. A wiper arm 44 is positioned to traverse sequentially the two winding sections $R_E$ at a speed which is four times that of the wiper arm 21 of the phase shift section 10. Thus the wiper arm 44 will make one complete revolution during the period when the wiper arm 21 makes one quarter, or 90°, of a complete revolution. This speed ratio is assured by having the shaft 45 connected to the wiper arm 21, appropriately geared, by a gear coupling 46, to the shaft 47, which in turn is connected to the wiper arm 44. A resistor $R_D$ is connected between the tap 42 and ground. Two series connected resistors $R_C$ are connected between the tap 43 and the wiper arm 44. The output of the cathode follower section 11 is fed through a lead 49 to the common connection 51 between the two resistors Rc. The output of the phase shifting device is taken between the wiper arm 44 and ground.

Referring now to Figure 2, there is shown the equivalent circuit diagram of the first quadrant of the phase shift section 10 having a variable phase output voltage $V\angle\phi$. In connection with the derivation to follow $\theta$ will be defined as the mechanical angle of rotation of the slider from the 0° tap 14 toward the 90° tap 15. These taps, as has previously been brought out, are located 90 mechanical degrees apart.

In order to simplify this diagram, Thevenin's theorem is applied to the portion of the equivalent circuit of Figure 2 composed of the shunting resistors $R_A$ (i. e. assuming commutator segment $R_B$ to be disconnected). The open-circuit voltage developed at the juncture of resistors $R_A$ can be readily found by noting the vector relationship between the applied voltages as shown in Figure 3. The resistance as viewed at the juncture of the resistors $R_A$ under this circuit condition, with the generator voltages short circuited, are the two resistors $R_A$ connected in parallel. The circuit just considered can now be replaced by the open circuit voltage $$\frac{E}{\sqrt{2}} \angle 45°$$

and the series connected resistance $$\frac{R_A}{2}$$

Simplifying the equivalent circuit diagram of Figure 2 by using the equivalent voltage generator and series resistance just found, there is obtained the equivalent simplified circuit diagram of Figure 4. By assigning arbitrary designations of $I_1$ and $I_2$ to two of the loop currents, it is seen that the third loop current is the sum of the first two loop currents. The voltage equations for these loops may then be derived and, by proper substitution, the output voltage $V\angle\phi$ obtained in terms of the applied voltages and the resistive components of the circuit:

$$V\angle\phi\left[\frac{90}{\theta}+2\frac{R_B}{R_A}\left(\frac{90-\theta}{90}\right)\right]=$$
$$E\left[\frac{90}{\theta}-1+j1+(1+j1)\frac{R_B}{R_A}\left(\frac{90-\theta}{90}\right)\right] \quad (1)$$

Letting $$K=\frac{R_B}{R_A}$$

Equation 1 may be simplified:

$$\frac{V\angle\phi}{E}=\frac{\left[1+\frac{90}{K\theta}\right]+j\left[1+\frac{90}{K(90-\theta)}\right]}{2+\frac{(90)^2}{K\theta(90-\theta)}} \quad (2)$$

Letting $$A=1+\frac{90}{K\theta}$$

and $$B=1+\frac{90}{K(90-\theta)}$$

an expression is obtained for the ratio of the absolute values of the output voltage to the applied input voltage:

$$\left|\frac{V}{E}\right|=\frac{\sqrt{A^2+B^2}}{A+B} \quad (3)$$

The angle at which the variable phase output voltage is positioned with respect to the 0° reference input voltage is:

$$\phi=\tan^{-1}\frac{B}{A} \quad (4)$$

It is apparent from the above that $\phi$ and $\theta$ will have identical values at 0°, 45° and 90°. For the typical embodiment shown, the value of K has been chosen such that $\phi$ is equal to $\theta$ at 22.5°. It should be noted that this will also insure coincidence at 67.5°. Substituting this angle in Equation 4 above, a value of K approximately equal to .55228 is obtained. If the relationship between the angles $\phi$ and $\theta$ for this value of K is computed, it will be seen that the value of K as used is not quite the optimum to balance the minus errors between these two angles against the plus errors, i. e. the largest minus errors are not equal to the largest plus errors. It is, therefore, possible to find a slightly different value of K which will optimize these inherent errors.

These errors could be further reduced by providing additional taps on potentiometer 13, additional commutator segments to cooperate with such added sections of the potentiometer, and additional phase related voltages E as determined by the number of taps and number of commutator segments. Thus, eight taps on the potentiometer and eight commutator segments would be fed by voltages E which have a 45° sequential phase relationship.

It is also possible to decrease the inherent errors between angles $\phi$ and $\theta$ by increasing the number of commutator segments and resistors $R_A$ without increasing the number of tap point on the potentiometer 14 or the number of phase related voltages E.

Using Equation 3, it is seen that the magnitude of the output voltage to the input voltage varies between 1.00 and .707 as the angle $\theta$ increases from $\theta=0°$ to $\theta=45°$. In order to keep the variable phase output voltage magnitude a constant, it is, therefore, necessary to compensate for this amplitude variation. This is accomplished in the amplitude correcting section 12, the input to which is isolated from the phase shift section output by a cathode follower stage 11 as is well known in the art.

As previously set forth, the amplitude correcting section consists of a linear potentiometer which is ganged to the phase shift section potentiometer 13 through a 1 to 4 gear train, or, to put it differently, the amplitude correcting section potentiometer wiper arm 44 traverses its potentiometer 14 once for every 90° of rotation of the potentiometer 13. This is possible because the amplitude correcting action has to take place in the same manner for every potentiometer winding section contained between two adjacent taps, or in other words, for every segment of the commutator 18. The computed response of the compensating potentiometer, as indicated by the ratio of the output voltage at any setting to the output voltage at the $\theta=45°$ setting (arm 44 in contact with tap 43), $$\frac{V_0}{V_0 \max}$$

will vary from .707 for $\theta=0°$ to 1.00 for $\theta=45°$. The total error to be expected may then be calculated by taking the product of the phase shifted voltage amplitude and the computed response of the compensating potentiometer. This will give a computed output voltage for the device which is approximately .479 of the applied input voltages E, with small variations due to the inherent errors and component errors as set forth above. The amplitude correction section calculations are based on the selection of resistors Rc and $R_E$ to have equal resistance values. Resistor $R_D$ has been chosen to yield the desired correction at $\theta=0°$ and $\theta=45°$ tap points which causes resistor $R_D$ to be equal to .5525 times the value of resistor $R_E$.

Thus, through the proper choice of the ratio of the resistors $R_B$ of the potentiometer winding 13 to the resistance of the resistors $R_A$, the output phase angle varies in a nearly linear manner from the 0° to the 90° setting of the potentiometer shaft 45—47 and that an amplitude correction section 12 maintains the linearly varying phase output at a constant amplitude.

While there has been shown and described an invention in connection with certain specific embodiments, it will, of course, be understood that it is not intended nor wished to be limited thereto since it is apparent that the principles herein disclosed are susceptible of numerous other applications, and modifications may be made in the circuit arrangement and the instrumentalities employed without departing from the spirit and scope of this invention as set forth in the appended claims.

I claim as my invention:

1. An electrical phase shifting device comprising a phase shifting potentiometer having a wiper arm in contact with its resistance element, at least two taps on said resistance element spaced apart a selected distance, a plurality of sources of voltages applied to said taps having a phase relationship which is a function of the spacing between said taps, a commutator having a segment associated with said spaced distance between taps of said resistance element, a first resistor connected between said one of said two taps and said commutator segment, a second resistor connected between said other of said two taps and said commutator segment, a contacting element movable on said commutator and connected to said wiper arm, said wiper arm sensing a phase varying voltage as it moves along said resistance element between said two taps.

2. An electrical phase shifting device comprising a phase shifting potentiometer having a wiper arm in contact with its resistance element, at least two taps on said resistance element spaced apart a selected distance, a plurality of sources of voltages applied to said taps having a phase relationship which is a function of the spacing between said taps, a commutator having a segment associated with said spaced distance between taps of said resistance element, a first resistor connected between said one of said two taps and said commutator segment, a second resistor connected between said other of said two taps and said commutator segment, a contacting element movable on said commutator and connected to said wiper arm, said wiper arm sensing a phase varying voltage as it moves along said resistance element between said two taps, and an amplitude correcting potentiometer system connected to said wiper arm having a constant amplitude output voltage.

3. An electrical phase shifting device comprising a phase shifting potentiometer having a wiper arm in contact with its resistance element, at least two taps on said resistance element spaced apart a selected distance, a plurality of sources of voltages applied to said taps having a phase relationship which is a function of the spacing between said taps, a commutator having a segment associated with said spaced distance between taps of said resistance element, a first resistor connected between said one of said two taps and said commutator segment, a second resistor connected between said other of said two taps and said commutator segment, a contacting element movable on said commutator and connected to said wiper arm, said wiper arm sensing a phase varying voltage as it moves along said resistance element between said two taps, an amplitude correcting potentiometer having its wiper arm coupled to said phase shifting potentiometer wiper arm, first and second taps spaced along the winding of said amplitude correcting potentiometer as a function of the spacing between said taps of said phase shifting potentiometer, means connecting said first tap on said amplitude correcting potentiometer winding to said amplitude correcting potentiometer wiper arm, means for coupling said phase varying voltage from said phase shifting potentiometer wiper arm to said connecting means, and impedance means connecting said second tap on said amplitude correcting potentiometer winding to ground, the output appearing between said amplitude correcting potentiometer wiper arm and ground having a substantially constant amplitude over the phase shifting range of said phase shifting potentiometer.

4. An electrical phase shifting device comprising a phase shifting potentiometer having a wiper arm in contact with its resistance element, a plurality of taps along said resistance element spaced apart a selected distance, a plurality of voltage sources applied to the taps having a phase relationship which is a function of the spacing between said taps, a commutator having a segment associated with said spaced distances between taps of said resistance element, resistors connected between each of said taps and said commutator segments associated with the portion of said potentiometer resistance element adjacent to said taps, a contacting element movable along said commutator and connected to said wiper arm, said wiper arm sensing a phase varying voltage as it moves along the tap-provided portion of said resistance element.

5. An electrical phase shifting device comprising a phase shifting potentiometer having a wiper arm in contact with its resistance element, a plurality of taps along said resistance element spaced apart a selected distance, a plurality of voltage sources applied to the taps having a phase relationship which is a function of the spacing between said taps, a commutator havingn a segment associated with said spaced distances between taps of said resistance element, resistors connected between each of said taps and said commutator segments associated with the portion of said potentiometer resistance element adjacent to said taps, a contacting element movable along said commutator and connected to said wiper arm, said wiper arm sensing a phase varying voltage as it moves along the tap-provided portion of said resistance element, and an amplitude correcting potentiometer system connected to said wiper arm having a constant amplitude output voltage.

6. An electrical phase shifting device comprising a phase shifting potentiometer having a wiper arm in contact with its resistance element, a plurality of taps along said resistance element spaced apart a selected distance, a plurality of voltage sources applied to the taps having a phase relationship which is a function of the spacing between said taps, a commutator having a segment associated with said spaced distances between taps of said resistance element, resistors connected between each of said taps and said commutator segments associated with the portion of said potentiometer resistance element adjacent to said taps, a contacting element movable along said commutator and connected to said wiper arm, said wiper arm sensing a phase varying voltage as it moves along the tap-provided portion of said resistance element, an amplitude correcting potentiometer having at least a first tap and a second tap spaced along its winding, means coupling the wiper arm of said amplitude correcting potentiometer and said phase shifting potentiometer wiper arm, means connecting said first tap of said amplitude correcting potentiometer winding to said amplitude correcting potentiometer wiper arm, means for coupling said phase varying voltage from said phase shifting potentiometer wiper arm to said connecting means, and impedance means connecting said second tap on said amplitude correcting potentiometer winding to ground, the output appearing between said amplitude correcting potentiometer wiper arm and ground having a substantially constant amplitude over the phase shifting range of said phase shifting potentiometer.

7. An electrical phase shifting device comprising a phase shifting potentiometer having a wiper arm in contact with its resistance element, at least two taps on said resistance element spaced apart a selected distance, a plurality of voltage sources connected between ground and said taps having a phase relationship which is a function of the spacing between said taps, a first resistor connected directly between one of said taps and said wiper arm, a second resistor connected directly between the other of said taps and said wiper arm, said wiper arm sensing a phase varying voltage relative to ground as it moves along said resistance element between said taps.

8. The combination of claim 6 wherein the means coupling the wiper arms of said amplitude correcting potentiometer and said phase shifting potentiometer includes a drive mechanism having a 4 to 1 ratio.

References Cited in the file of this patent

UNITED STATES PATENTS

| | | |
|---|---|---|
| 2,241,615 | Plebanski | May 13, 1941 |
| 2,510,087 | De Rosa | June 6, 1950 |

Disclaimer 2,778,988.—*George E. Pihl*, Abington, Mass. ELECTRICAL PHASE SHIFTING DEVICE. Patent dated Jan. 22, 1957. Disclaimer filed Mar. 11, 1960, by the assignee, *Acton Laboratories, Inc.*

Hereby enters this disclaimer to claim 7 of said patent.

[*Official Gazette April 19, 1960.*]